April 9, 1929. J. LEONARD 1,708,676
DEMOUNTABLE RIM ATTACHMENT
Filed Sept. 9, 1926
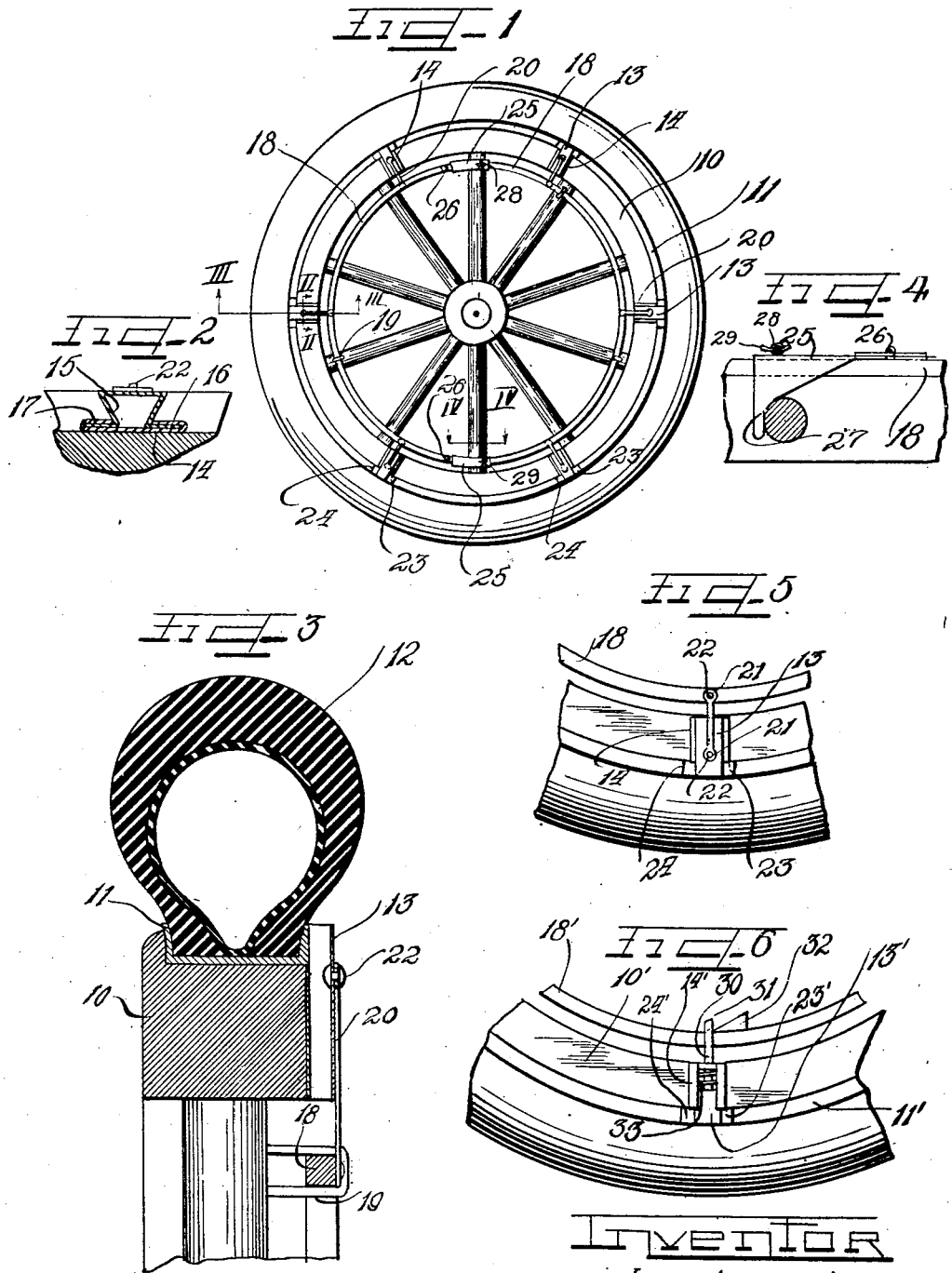
Inventor
Jean Leonard Patented Apr. 9, 1929.

1,708,676

UNITED STATES PATENT OFFICE.

JEAN LEONARD, OF LOS ANGELES, CALIFORNIA.

DEMOUNTABLE-RIM ATTACHMENT.

Application filed September 9, 1926. Serial No. 134,346.

This invention relates to vehicle wheels and more particularly to demountable rim attachments, although it may be employed with equal advantage for other purposes.

It contemplates more especially the provision of novel means for maintaining relatively movable members in rigid relation so as to enable the ready removal or assembly thereof.

Devices of known construction have not proven entirely satisfactory in that considerable difficulty is encountered in effecting the desired relation and rigidity between the cooperating elements, it being very laborious to attach or remove one member from the other. This is especially true in demountable rim constructions employing known expedients.

Further, to arrange and maintain a rim in its desired relation with respect to a wheel, it is highly desirable to provide simple and effective securing means which will enable the convenient and ready assembling and dismantling of the rim with respect to the wheel without necessitating the use of tools or requiring any appreciable effort and time.

One object of the present invention is to simplify the construction and improve the operation of devices of the character mentioned.

Another object is to provide improved securing means which can be readily interposed between adjacent members to maintain them in the desired relation.

A further object is to provide improved means of inexpensive construction to facilitate convenient and instantaneous assembling and dismantling of the relative units.

A still further object is to provide securing means simultaneously operable by a single means to selectively effect engagement and disengagement thereof.

Other objects and advantages will appear from the following description of an illustrated embodiment of the present invention.

In the drawings:

Figure 1 is a view in elevation of a wheel embodying features of the present invention.

Figure 2 is a sectional view taken substantially along line II—II of Figure 1.

Figure 3 is a sectional view taken substantially along line III—III of Figure 1.

Figure 4 is a view taken substantially along line IV—IV of Figure 1.

Figure 5 is an enlarged detail of an engaging lug shown in Figure 1.

Figure 6 is an enlarged detail similar to Figure 5 showing a modified embodiment of the present invention.

In the particular embodiment of the present invention which has been herein selected for illustration, the related units comprise a vehicle wheel 10 of standard construction, having associated therewith the usual demountable tire rim 11 adapted to carry the customary tire 12. In order to maintain the related adjacent units, in this instance the wheel 10 and rim 11, in rigid relation so as to permit the ready relative attachment or removal thereof, means are provided to be simultaneously and selectively actuatable by a single movement as will hereinafter appear.

In the structure shown, the means comprises a plurality of engaging lugs 13 equally spaced about the periphery of the wheel, they being slidable in a radial direction within suitable guides 14 secured to the wheel 10 adjacent the periphery thereof. The engaging lugs 13, in this instance, are stamped from sheet metal to present a trapezoidal cross section 15 terminating in laterally extending flanges 16 which cooperate with the correspondingly shaped grooves defined by the overlapping edges 17 of the guide members 14. The guide members 14 are secured to the wheel 10 by means of any appropriate fasteners (not shown), the grooves thereof extending in a radial direction with respect to the axis of the wheel.

Actuating means, in this instance a ring 18 preferably of metal having a substantially rectangular cross section, is rotatively associated with the wheel 10 by means of the anchoring guides 19 secured in this instance to the spokes of the wheel to slidably receive the ring 18 which preferably is of such size as to have the periphery thereof in proximity to the extremities of the engaging lugs 13. The lugs 13 are operatively connected to the ring 18 by means of a link 20 individual to each lug 13, the former having the free extremities thereof apertured as at 21 to receive freely fitting pins 22 whereby the links are pivotally associated with the ring 18 and the engaging lugs 13. Thus it will be apparent that rotary movement of the ring 18 will simultaneously move all the lugs 13 radially within their guides 14 to either engage or disengage the rim 11 depending upon the direction in which the wheel is rotated.

The rim 11 is preferably provided with means for receiving the engaging lug 13 so as to prevent relative movement between the wheel and rim. The means in this instance comprises a pair of spaced projections 23 and 24 adapted to receive the engaging lugs 13 therebetween, it being obvious that the projections may be integrally or otherwise secured to the rim 11. It is to be noted that the projections may be dispensed with in that the friction between the engaging lugs 13 and the rim may be relied upon to prevent relative movement therebetween.

To prevent accidental movement of the ring 18 thereby insuring against disengagement of the lugs from the rim, the ring is provided, in this instance, with a pair of diametrically opposed members 25 hingedly secured thereto at one extremity thereof as at 26, thereby enabling the members 25 to swing laterally with respect to the plane of the wheel. The hingedly mounted members 25 are provided at their extremity with spaced laterally projecting fingers 27 which straddle the ring 18 and engage the spoke of the wheel disposed therebelow as shown in Figure 4, both members 25 engaging the spokes on a corresponding side to prevent movement thereof in either direction. If desired, any appropriate means may be employed to maintain the fingers 27 in engagement with the spokes or other obstruction cooperating therewith, and in the present embodiment an eye 28 projecting from the ring 18 through a suitable aperture in the member 25 is provided whereby a cotter pin 29 or other suitable expedient may be projected therethrough.

The structure illustrated in Figure 6 is a modified embodiment of the present invention, comprising a wheel 10' having associated therewith a demountable tire rim 11'. Secured to the wheel 10' in proximity to the rim 11' are a plurality of radially extending guides 14' which slidably receive the engaging lugs 13' having an axial stem 30 integrally associated therewith, it terminating in an appropriately looped extension 31 which, in this instance, is operatively connected to the ring 18' by virtue of cams 32 secured thereon in any suitable manner for cooperating with the looped extension 31 of each of the stems 30. A spring 33 is interposed between the engaging lugs 13 and a portion of the guide 14' to normally project the engaging lug 13' in engagement with the rim 11'. Suitable projections or guides 23' and 24' are integrally or otherwise associated with the rim 11' in spaced relation to receive the lug 13' as hereinabove described.

With this arrangement of parts it will be apparent that rotation of the ring 18' in a clockwise direction will retract the lug 13' to effect disengagement thereof from the tire rim 11', owing to the cam 32 which elevates the rod 30 a distance proportional to the rotative movement of the ring 18'.

I am aware that many changes may be made and numerous details of the construction may be varied through a wide range without departing from the principles of this invention, and I therefore do not purpose limiting the patent granted hereon, otherwise than necessitated by the prior art.

I claim as my invention:

In a vehicle wheel, a demountable rim, movable members in connection with said wheel adapted to engage said rim, a single actuator for said members, and means connected to said actuator to retain said members in engaged position against accidental disengagement, said means comprising pivotal members adapted to engage corresponding sides of certain of the spokes in said wheel.

In testimony whereof I have hereunto subscribed my name.

JEAN LEONARD.